US012471633B2

(12) United States Patent
Tack et al.

(10) Patent No.: US 12,471,633 B2
(45) Date of Patent: Nov. 18, 2025

(54) HEATER WITH AT LEAST TWO ADJACENT METAL MESHES

(71) Applicant: PHILIP MORRIS PRODUCTS S.A., Neuchatel (CH)

(72) Inventors: Filip Tack, Bournens (CH); Ihar Nikolaevich Zinovik, Peseaux (CH)

(73) Assignee: Philip Morris Products S.A., Neuchatel (CH)

( * ) Notice: Subject to any disclaimer, the term of this patent is extended or adjusted under 35 U.S.C. 154(b) by 747 days.

(21) Appl. No.: 17/263,714

(22) PCT Filed: Jul. 31, 2019

(86) PCT No.: PCT/EP2019/070577
§ 371 (c)(1),
(2) Date: Jan. 27, 2021

(87) PCT Pub. No.: WO2020/025654
PCT Pub. Date: Feb. 6, 2020

(65) Prior Publication Data
US 2021/0161209 A1 Jun. 3, 2021

(30) Foreign Application Priority Data
Aug. 1, 2018 (EP) .................................... 18186791

(51) Int. Cl.
*A24F 40/465* (2020.01)
*A24F 40/10* (2020.01)
(Continued)

(52) U.S. Cl.
CPC ............ *A24F 40/465* (2020.01); *A24F 40/10* (2020.01); *A24F 40/20* (2020.01); *A24F 40/44* (2020.01);
(Continued)

(58) Field of Classification Search
CPC ........ A24F 40/465; A24F 40/10; A24F 40/20; A24F 40/44; A24F 40/46; A24F 47/00;
(Continued)

(56) References Cited

U.S. PATENT DOCUMENTS 5,996,589 A 12/1999 St. Charles
9,459,021 B2 10/2016 Greim
(Continued)

FOREIGN PATENT DOCUMENTS

CN 207 505 931 6/2018
EA 002185 2/2002
(Continued)

OTHER PUBLICATIONS

Office Action issued in Japan for Application No. 2021-504771 dated Mar. 4, 2022 (7 pages). English translation included.
(Continued)

*Primary Examiner* — Justin M Kratt
(74) *Attorney, Agent, or Firm* — Mueting Raasch Group

(57) ABSTRACT

The invention relates to a heater for generating an inhalable aerosol in an aerosol-generating device. The heater comprises at least two meshes. The meshes are arranged to be distanced from each other so that the meshes are configured for enabling wicking of aerosol-forming substrate between the meshes.

14 Claims, 3 Drawing Sheets

Figure 1:
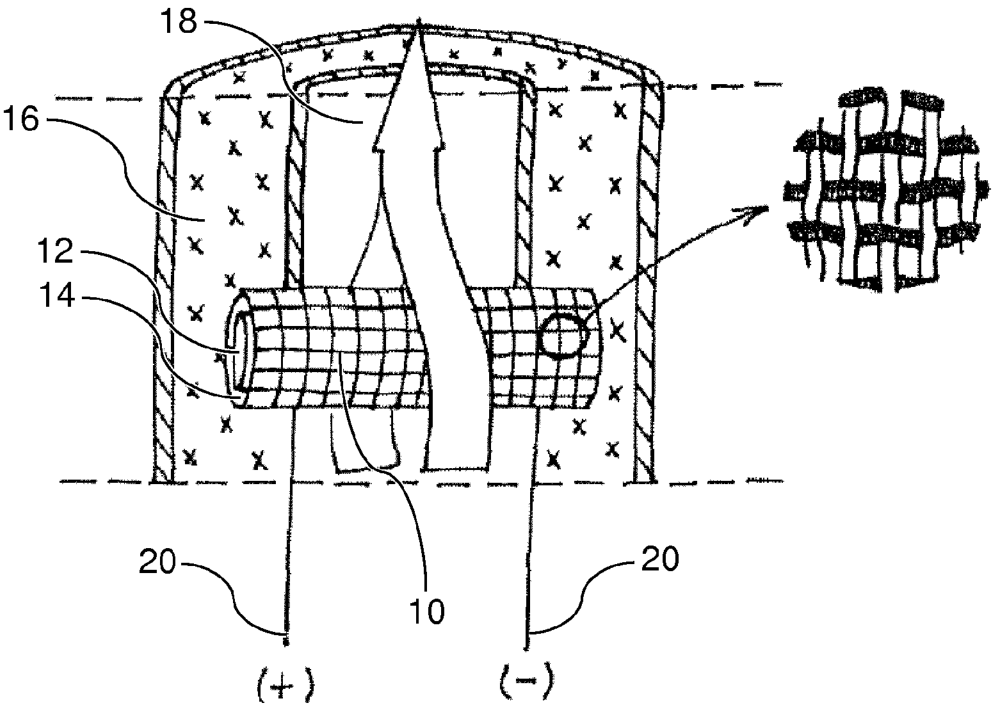

(51) Int. Cl.

| | |
|---|---|
| ***A24F 40/20*** | (2020.01) |
| ***A24F 40/44*** | (2020.01) |
| ***A24F 40/46*** | (2020.01) |
| ***A24F 47/00*** | (2020.01) |
| ***H05B 3/34*** | (2006.01) |
| ***H05B 3/40*** | (2006.01) |
| ***H05B 6/10*** | (2006.01) |
| ***H05B 6/36*** | (2006.01) |
| *H05B 3/42* | (2006.01) |

(52) U.S. Cl.

CPC .............. *A24F 40/46* (2020.01); *A24F 47/00* (2013.01); *H05B 3/34* (2013.01); *H05B 3/40* (2013.01); *H05B 6/105* (2013.01); *H05B 6/36* (2013.01); *H05B 6/362* (2013.01); *H05B 3/42* (2013.01)

(58) Field of Classification Search

CPC . H05B 3/34; H05B 3/40; H05B 6/105; H05B 6/36; H05B 6/362; H05B 3/42

See application file for complete search history.

(56) References Cited

U.S. PATENT DOCUMENTS

| | | | | |
|---|---|---|---|---|
| 9,516,899 | B2 | 12/2016 | Plojoux | |
| 9,532,603 | B2 | 1/2017 | Plojoux | |
| 9,693,587 | B2 | 7/2017 | Plojoux | |
| 9,888,719 | B2 | 2/2018 | Cadieux | |
| 10,188,144 | B2 | 1/2019 | Dickens | |
| 10,531,692 | B2 | 1/2020 | Althorpe | |
| 10,842,192 | B2 | 11/2020 | Mironov | |
| 11,039,642 | B2 | 6/2021 | Zuber | |
| 11,717,028 | B2 * | 8/2023 | Raichman | A61P 27/06 514/454 |
| 2014/0238423 | A1 | 8/2014 | Tucker | |
| 2015/0217068 | A1 | 8/2015 | Wakalopulos | |
| 2015/0320116 | A1 | 11/2015 | Bleloch | |
| 2017/0280772 | A1 | 10/2017 | Batista | |
| 2018/0146709 | A1 | 5/2018 | Bessant | |
| 2020/0397044 | A1 | 12/2020 | Sutton | |
| 2021/0378304 | A1 * | 12/2021 | Bogran | A24F 40/485 |

FOREIGN PATENT DOCUMENTS

| | | |
|---|---|---|
| EA | 023735 | 7/2016 |
| JP | 2010187624 | 9/2010 |
| JP | 2017-505664 | 2/2017 |
| JP | 2017-506915 | 3/2017 |
| JP | 2017-533726 | 11/2017 |
| KR | 10-2018-0069849 | 6/2018 |
| KZ | 31520 | 9/2016 |
| RU | 2602053 | 11/2016 |
| RU | 2604012 | 12/2016 |
| RU | 2611487 | 2/2017 |
| RU | 2657215 | 6/2018 |
| WO | WO 2015/114325 | 8/2015 |

OTHER PUBLICATIONS

Search Report and Written Opinion for PCT/EP2019/070577 dated Jul. 31, 2019 (19 pages).

Office Action issued in Russia for Application No. 2021102030 dated Jul. 7, 2021 (5 pages). English translation included.

Office Action issued in Korea for Application No. 10-2021-7000723 dated Jan. 19, 2023 (5 pages). English translation included.

Office Action issued in Korea for Application No. 10-2021-7000723 dated Sep. 24, 2022 (8 pages). English translation included.

* cited by examiner

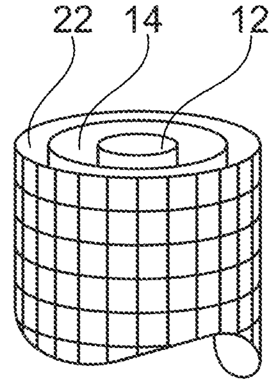
Fig. 2A
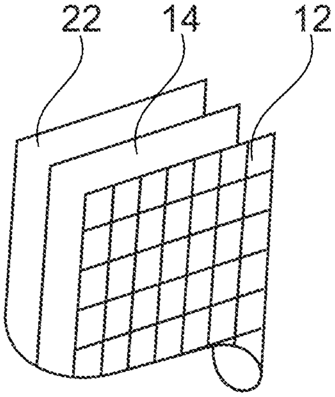
Fig. 2B
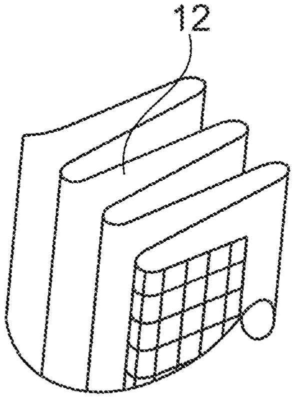
Fig. 2C
Fig. 2

HEATER WITH AT LEAST TWO ADJACENT METAL MESHES

This application is a U.S. National Stage Application of International Application No. PCT/EP2019/070577 filed Jul. 31, 2019, which was published in English on Feb. 6, 2020 as International Publication No. WO 2020/025654 A1. International Application No. PCT/EP2019/070577 claims priority to European Application No. 18186791.2 filed Aug. 1, 2018.

The present invention relates to a heater for generating an inhalable aerosol in an aerosol-generating device.

It is known to provide an aerosol-generating device such as an e-cigarette with an electrically resistive heater in the shape of a mesh heater. The mesh heater comprises interstices, through which aerosol-forming substrate can permeate so that the heating surface is increased. The mesh heater may be provided in an airflow channel of the device. The vaporized aerosol-forming substrate may be entrained in air flowing adjacent to the mesh heater thereby creating an inhalable aerosol. The mesh heater is provided with contacts for supplying electrical energy to the mesh.

Conventional heaters are typically configured as non-disposable heaters. The configuration of the heater to be disposable may require substantial re-design. Also, typical heaters are complex to be manufactured. The complex manufacturing and the complex design may result in product inconsistencies. Due to the fact that conventional heaters may be non-disposable, over time undesired residues may build up on the heater surface and it may be necessary to add isolating materials between a liquid storage and the heater to prevent contamination of the heater.

It would be desirable to have a mesh heater which is easy to manufacture with high consistency. Also, it would be desirable to design the heater to be cost-effective.

According to an aspect of the invention there is provided a heater for generating an inhalable aerosol in an aerosol-generating device. The heater comprises at least two meshes. The meshes are arranged to be distanced from each other so that the meshes are configured for enabling aerosol-forming substrate to be wicked between the meshes.

Wicking of aerosol-forming substrate is optimized by providing at least two meshes distanced from each other. The meshes are spaced apart from each other such that capillary action of the aerosol-forming substrate disposed between the meshes is increased and optimized. In comparison with a single mesh sheet, more aerosol-forming substrate can thus be wicked towards the space of the device in which the substrate is vaporized for creating an inhalable aerosol.

The at least two meshes may be configured as concentrically arranged tubular meshes. A first mesh may be provided with a first diameter. A second meshes may be provided with a second diameter. The first diameter may be smaller than the second diameter. The first mesh may be arranged inserted into the second mesh.

The tubular shape of the meshes may create a path for wicking aerosol-forming substrate. Using at least two meshes for this purpose may increase the diameter of the path which may be used for wicking the aerosol-forming substrate without decreased capillary action. A single sheet only enables a tubular mesh scroll of a certain diameter, because capillary action would be decreased if the scroll diameter would be larger than a certain value. Two meshes are not bound by this relatively small diameter. The amount of aerosol-forming substrate to be wicked by the meshes may be freely chosen if multiple tubular meshes are used.

Additional tubular meshes may be used if the overall diameter of the tubular mesh assembly is to be increased without diminished capillary action of the aerosol-forming substrate between the individual mesh layers.

The at least two meshes may be configured to be substantially flat. Alternatively to providing the meshes in a tubular shape, the meshes may be provided from flat sheets. Wicking may be realized by the distance between the flat mesh sheets being so that the capillary action acting on the aerosol-forming substrate to be wicked is optimized. Increasing the number of flat sheets arranged to be distanced from each other may lead to wicking more aerosol-forming substrate. Also, larger sheets may be utilized in order to increase the surface of the individual meshes.

The at least two meshes may be configured as a single crimped mesh. The mesh according to this aspect is bent so that the mesh resembles an S-shape. The individual layers of the mesh are thus formed from the bend sections of the mesh laying adjacent to each other and distanced from another. Depending upon the desired amount of aerosol-forming substrate to be wicked, the number of mesh layers as well as the distance between the mesh layers may be chosen accordingly.

At least one of the meshes may be configured as an electrically resistive metal heater. The metal mesh may be formed of conductive metallic material. The metal mesh may have a flexibility to be rolled into a tubular and/or crimped shape.

The meshes may comprise a plurality of electrically conductive filaments configured to form the individual mesh. The filaments may be provided with a woven or non-woven fabric.

The electrically conductive filaments may define interstices between the filaments and the interstices may have a width of between 10 μm and 100 μm. Preferably the filaments give rise to capillary action in the interstices, so that in use, substrate to be vaporised is drawn into the interstices, increasing the contact area between the heater and the substrate.

Each mesh may have a mesh size of between 160 and 600 Mesh US (+/−10%) (i.e. between 160 and 600 filaments per inch (+/−10%)). The width of the interstices is preferably between 75 μm and 25 μm. The percentage of open area of the meshes, which is the ratio of the area of the interstices to the total area of the meshes, is preferably between 25 and 56%. The meshes may be formed using different types of weave or lattice structures. Alternatively, the electrically conductive filaments consist of an array of filaments arranged parallel to one another.

The electrically conductive filaments may have a diameter of between 8 μm and 100 μm, preferably between 8 μm and 50 μm, and more preferably between 8 μm and 39 μm. The area of the meshes may be small, preferably less than or equal to 25 $mm^2$, allowing it to be incorporated in a handheld device.

The electrically conductive filaments may comprise any suitable electrically conductive material. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminium- titanium- zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. The filaments may be coated with one or more insulators. Preferred materials for the electrically conductive filaments are 304, 316, 304 L, 316 L stainless steel, and graphite. Preferably, stainless steel, nichrome wire, aluminum or tungsten is used.

The electrical resistance of a mesh is preferably between 0.3 and 4 Ohms. More preferably, the electrical resistance of a mesh is between 0.5 and 3 Ohms, and more preferably about 1 Ohm.

The heater may comprise at least one mesh formed from a first material and at least one mesh formed from a second material that is different from the first material. This may be beneficial for electrical or mechanical reasons. For example, one or more of the meshes may be formed from a material having a resistance that varies significantly with temperature, such as an iron aluminium alloy. This allows a measure of resistance of the mesh to be used to determine temperature or changes in temperature. This can be used in a puff detection system and for controlling heater temperature to keep it within a desired temperature range.

For acting as an electrically resistive metal heater, preferably the outer mesh is utilized. The outer mesh is the mesh which faces an airflow channel of the device. In this instance, a mesh which is surrounded by the outer mesh is considered as an inner mesh that may be different from the outer mesh.

The electrically resistive metal heater mesh may comprise electrical contacts for supplying electrical energy to the mesh. The electrical resistance of a mesh is preferably at least an order of magnitude, and more preferably at least two orders of magnitude, greater than the electrical resistance of contacts. This ensures that the heat generated by current through the heater is localized to the meshes of electrically conductive filaments. It is advantageous for the heater to have a low overall resistance if the device is supplied power by a battery. Minimizing parasitic losses between the electrical contacts and the meshes is also desirable to minimize parasitic power losses. Large current due to a low resistance allows high power to be delivered to the heater. This allows a temperature of the heater comprising the electrically conductive filaments to quickly reach to a desired temperature.

First and second electrically conductive contacts may be fixed directly to the electrically conductive filaments. For example, the contacts may be formed from a copper foil. Alternatively, the first and second electrically conductive contacts may be integral with the electrically conductive filaments. For example, a mesh may be formed by etching a conductive sheet to provide a plurality of filaments between two contacts.

The electrically resistive metal heater mesh may be configured to heat the aerosol-forming substrate for creating an inhalable aerosol. The meshes therefore have a double functionality. The first functionality of the meshes is to wick aerosol-forming substrate. The second functionality of the meshes is to heat the aerosol-forming substrate in order to generate an inhalable vapor. The aerosol-forming substrate which is vaporized is replaced by fresh aerosol-generating a substrate which is wicked by the meshes.

Both, preferably all, meshes may be configured as electrically resistive metal heater.

According to this aspect, at least two meshes are configured as electrically resistive metal heater meshes. These meshes wick aerosol-forming substrate and heat the substrate at the same time for generating an inhalable vapor.

The at least two metal meshes may be connected to a power supply in series or in parallel.

Series connection of the metal meshes for a power supply may result in only two contacts being necessary for contacting the power supply with the metal meshes. According to this aspect, a single mesh such as the outer mesh may be provided with contacts for supplying electrical energy to the mesh. The further meshes, which are configured as electrically resistive metal mesh heaters, may be electrically connected with the mesh which is provided with contacts. Also, a first contact may be provided on a first mesh which is configured as an electrically resistive metal mesh heater, wherein the second contact may be provided on a further mesh, which is also configured as an electrically resistive metal mesh heater. Current may flow from the first mesh to the further mesh. Between the first mesh and the further mesh, multiple meshes may be arranged. The multiple meshes may be electrically connected with each other. The electrical connection may be configured such that the current essentially flows through the whole length of the meshes for uniformly heating the meshes. The first contact may be provided at a first end of the first mesh which is configured as an electrically resistive metal mesh heater. A first connection between the first mesh and a second mesh may be provided at a second end opposite the first and. A second contact may be provided on a first end of a second mesh such that the current flows in a U-shape from the first contact through the first mesh, through the first connection, through the second mesh and towards the second contact. If multiple meshes are provided, electrical contacts between the meshes may be arranged alternating between the first end and the second end so that the current flows through all of the meshes from the first contact towards the second contact.

Alternatively, the meshes may be connected in parallel to the power supply. According to this aspect, preferably each of the meshes is provided with a pair of contacts at opposite ends of the meshes for enabling uniform flow of electrical energy to the meshes and therefore for uniform heating.

Electrical connections may be provided bridging both, preferably all, metal meshes.

By providing electrical connections between the metal meshes, it is not necessary to provide separate electrical contacts for each metal mesh for supplying electrical energy to the respective metal meshes. According to this aspect, only two contacts are necessary, wherein the first contact is provided for connecting a first metal mesh with the power supply, and the second contact is provided connecting a further metal mesh with the power supply, wherein the first metal mesh and potentially multiple further metal meshes are connected with the further metal mesh by means of the electrical connections between the metal meshes. Electrical current flows from the power supply through the first contact, through the first mesh and further through the electrical connection towards the further mesh, and potentially multiple further meshes, and towards the second contact.

The heater may comprise an induction coil arranged to surround the at least two meshes and may be configured for heating the at least two meshes. The at least two meshes may be made of susceptor material.

According to this aspect, the meshes are not provided as electrically resistive metal mesh heaters. The meshes according to this aspect are formed from susceptor material such that a current flowing through the induction coil leads to eddy currents in the meshes, resulting in heating of the meshes. The induction coil may be arranged to directly surround the meshes. Alternatively, the induction coil may be arranged distanced from the meshes in the associated aerosol-generating device. Particularly if the heater is provided as a disposable heater, separating the induction coil from the heater has the advantage that the induction coil doesn't have to be disposed together with the heater.

The heater may further comprise a tubular heater, which may be arranged distanced from and surrounding the at least two meshes.

According to this aspect, the at least two meshes may or may not be provided as electrically resistive metal mesh heaters. The tubular heater arranged to surround the at least two meshes is configured for heating the aerosol-forming substrate that is wicked between the at least two meshes towards the tubular heater. The tubular heater may be configured as a mesh or as a solid heater. Preferably, the tubular heater is formed from metal.

The tubular heater may be provided with electrical contacts for supplying electrical energy from a power supply to the tubular heater. The meshes according to this aspect may be provided only for wicking aerosol-forming substrate. Alternatively, the meshes may be provided for heating the aerosol-forming substrate in addition to the tubular heater also heating the aerosol-forming substrate. The tubular heater may be provided adjacent to the meshes but not in direct contact with the meshes such that no electrical connection is developed between the tubular heater and the meshes. The tubular heater may, however, be arranged to be distanced from the meshes such that the tubular heater contributes to the wicking of aerosol-forming substrate. In other words, the distance between the tubular heater and the meshes may be chosen such that capillary action takes place to wick aerosol-forming substrate into the space between the tubular heater and the meshes.

At least two tubular heaters may be provided, which may be arranged to be distanced from and surrounding the at least two meshes. The at least two tubular heaters may be provided near opposite ends of the heater.

Uniform aerosol generation may be facilitated by providing two tubular heaters at opposite ends of the heater.

The tubular heater may cover the outer surface of the at least two meshes. Covering the outer surface of the at least two meshes may result in uniform generation of aerosol.

The at least two meshes may be arranged distanced from each other by 5 to 200 μm, preferably 10 to 150 μm, more preferably 20 to 100 μm.

This distance between the two meshes may optimize capillary action of the aerosol-forming substrate between the two meshes. If multiple meshes are provided, preferably each of these meshes is distanced from neighboring meshes by 5 to 200 μm, preferably 10 to 150 μm, more preferably 20 to 100 μm. if a tubular heater is provided, preferably the tubular heater is distanced from the nearest mesh by 5 to 200 μm, preferably 10 to 150 μm, more preferably 20 to 100 μm.

The invention also relates to an aerosol-generating device for generating an inhalable aerosol, wherein the device comprises:

a storage portion for storing aerosol-forming substrate, a heater as described above, and a power supply for supplying power to the heater.

The at least two meshes contact the storage portion for enabling wicking of aerosol-forming substance from the storage portion towards a heating chamber of the aerosol-generating device.

The storage portion may be a liquid storage portion. The storage portion may comprise a housing containing liquid aerosol-forming substrate. The heater may be fixed to the housing of the liquid storage portion. The housing may preferably be a rigid housing and impermeable to fluid. As used herein "rigid housing" means a housing that is self-supporting. The rigid housing of the liquid storage portion preferably provides mechanical support to the heater. The storage portion may comprise capillary material configured to convey liquid aerosol-forming substrate to the heater.

The capillary material may have a fibrous or spongy structure. The capillary material preferably comprises a bundle of capillaries. For example, the capillary material may comprise a plurality of fibers or threads or other fine bore tubes. The fibers or threads may be generally aligned to convey liquid to the heater. Alternatively, the capillary material may comprise sponge-like or foam-like material. The structure of the capillary material forms a plurality of small bores or tubes, through which the liquid can be transported by capillary action. The capillary material may comprise any suitable material or combination of materials. Examples of suitable materials are a sponge or foam material, ceramic- or graphite-based materials in the form of fibers or sintered powders, foamed metalor plastics material, a fibrous material, for example made of spun or extruded fibers, such as cellulose acetate, polyester, or bonded polyolefin, polyethylene, terylene or polypropylene fibers, nylon fibers or ceramic. The capillary material may have any suitable capillarity and porosity so as to be used with different liquid physical properties. The liquid has physical properties, including but not limited to viscosity, surface tension, density, thermal conductivity, boiling point and vapour pressure, which allow the liquid to be transported through the capillary device by capillary action.

The capillary material may be in contact with the electrically conductive filaments of the meshes. The capillary material may extend into interstices between the filaments. The heater may draw liquid aerosol-forming substrate into the interstices by capillary action. Then, the aerosol-forming substrate may be wicked further between the two meshes.

The aerosol-forming substrate may be a substrate capable of releasing volatile compounds that can form an aerosol. The volatile compounds may be released by heating the aerosol-forming substrate. The aerosol-forming substrate is preferably a liquid aerosol-forming substrate.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. An aerosol-former is any suitable known compound or mixture of compounds that facilitates formation of a dense and stable aerosol. The aerosol-former may be substantially stable against thermal degradation at the operating temperature of the device. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol and, most preferred, glycerine. The aerosol-forming substrate may comprise other additives and ingredients, such as flavourants.

The device comprises a power supply, typically a battery such as a lithium iron phosphate battery, within the main body of the housing. As an alternative, the power supply may be another form of charge storage device such as a capacitor. The power supply may require recharging and may have a capacity that allows for the storage of enough energy for one or more smoking experiences. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the heater.

The device may be an electrically operated smoking device. The device may be a handheld aerosol-generating device. The aerosol-generating device may have a size comparable to a conventional cigar or cigarette. The smoking device may have a total length between approximately 30 mm and approximately 150 mm. The smoking device may have an external diameter between approximately 5 mm and approximately 30 mm.

The invention also relates to a method for manufacturing a heater for generating an inhalable aerosol in an aerosol-generating device, wherein the method comprises the following step:

i) providing at least two meshes, wherein the meshes are arranged distanced from each other so that the meshes are configured for enabling wicking of aerosol-forming substrate between the meshes.

The invention will be further described, by way of example only, with reference to the accompanying drawings in which:

FIG. 1 shows a heater 10 having a tubular shape. The heater 10 comprises a first mesh 12 and a second mesh 14. The meshes 12, 14 are preferably formed from metal and configured as electrical heaters. The meshes 12, 14 may, however, also be formed from a susceptor material, in which case an induction coil surrounding the meshes 12, 14 is provided for heating the meshes 12, 14.

Both meshes 12, 14 have a tubular shape. The first mesh 12 has a diameter which is smaller than the diameter of the second mesh 14 so that the first mesh 12 can be arranged inside of the second mesh 14. The meshes 12, 14 are distanced from each other. The distance between the two meshes 12, 14 is chosen such that liquid aerosol-forming substrate can be wicked between the two meshes 12, 14 by capillary action.

The meshes 12, 14 are arranged contacting a liquid storage 16. The liquid storage 16 contains the liquid aerosol-forming substrate. The substrate is configured for generating an inhalable aerosol after being heated. The meshes 12, 14 are arranged to span a space and be in contact with the liquid storage 16 at both ends of the meshes 12, 14. The spanned space is an airflow channel 18 of an aerosol-generating device, in which the heater 10 is arranged. The air flowing through the airflow channel 18 is indicated by arrows next to the meshes 12, 14. The air flows around the meshes 12, 14 for entraining vaporized substrate. Liquid aerosol-forming substrate is wicked from the liquid storage 16 towards the center of the airflow channel 18 for aerosol generation. The meshes 12, 14 are configured to heat the substrate, preferably by being configured as resistive heaters, and thus have a double functionality. The first functionality of the meshes 12, 14 is to wick the substrate from the liquid storage 16 towards the center of the airflow channel 18. The second functionality of the meshes 12, 14 is to heat the substrate, thereby vaporizing the substrate.

The liquid storage 16 preferably contains capillary material for enabling storage of the liquid aerosol-forming substrate. The meshes 12, 14 preferably penetrate the liquid storage 16 so that the meshes 12, 14 extend into the liquid storage 16. In this way, the contact surface between the liquid aerosol-forming substrate and the meshes 12, 14 is increased and wicking of the substrate from the liquid storage 16 towards the airflow channel 18 is optimized. More than two meshes 12, 14 may be provided, if the amount of substrate to be wicked should be increased. Each individual mesh 12, 14 is, independently of the number of meshes, arranged to be distanced to the next mesh so that capillary action taking place in the space between the meshes 12, 14 is enabled.

FIG. 1 further shows contacts 20 for contacting the meshes 12, 14. The contacts 20 are configured to supply electrical energy from a power source such as a battery towards the meshes 12, 14. The aerosol-generating device preferably comprises a controller for controlling energy supply to the meshes 12, 14. The device may comprise a puff sensor such as a pressure sensor for detecting a puff of a user. The controller may control supply of electrical energy towards the meshes 12, 14 in response to a detected puff. In FIG. 1, two contacts 20 are shown. In this case, the meshes 12, 14 may be electrically connected with each other such that current can flow from a first contact 20 though both of the two meshes 12, 14 towards a second contact 20. Also, only the outer mesh 14, i.e. the second mesh 14, may be used for heating, while the inner mesh 12, i.e. the first mesh 12, may only be used to facilitate the desired degree of wicking. Alternatively, pairs of contacts 20 could be provided for individually contacting corresponding meshes 12, 14. If multiple meshes 12, 14 are used for heating, these meshes 12, 14 may be contacted parallel or serially. Also shown in the right part of FIG. 1 is a blow-up of the mesh construction of the meshes 12, 14. The meshes 12, 14 preferably are configured as woven wires.

FIG. 2 shows different embodiments of mesh types. The first embodiment shown in FIG. 2A is the embodiment shown in FIGS. 1 and 3, in which the meshes 12, 14 are configured as tubular meshes 12, 14, wherein the first mesh 12 is arranged inside of the second mesh 14. In comparison with the embodiments shown in FIGS. 1 and 3, however, FIG. 2A shows a third mesh 22 surrounding the first and second meshes 12, 14. In total, three meshes 12, 14, 22 are thus provided for increased surface area and for optimized wicking. Any desired number of meshes may be employed, and any number of those meshes may be used for heating, while all meshes contribute to wicking of substrate.

FIG. 2B shows a further embodiment, in which the individual meshes 12, 14, 22 are provided as flat meshes 12, 14, 22. Again, the meshes 12, 14, 22 are arranged distanced from each other such that liquid aerosol-forming substrate can be wicked between the individual mesh layers 12, 14, 22. Instead of the tubular meshes 12, 14 shown in FIGS. 1 and 3, the flat meshes 12, 14, 22 shown in FIG. 2B may be utilizing to contact the liquid storage 16 and span the airflow channel 18 for aerosol generation. As described with reference to FIG. 1, the contacts 20 contacting the mesh 12, 14, 22 may be arranged to only contact one mesh 12. In this case only this mesh 12 will be configured as a heating mesh. The meshes 12, 14, 22 may alternatively be connected with each other or contacted separately by corresponding contacts 20.

FIG. 2C shows a further embodiment of a mesh 12. In this embodiment, the mesh 12 is configured as a single mesh 12. However, the mesh 12 is crimped so that layers of the mesh 12 are disposed next to each other. Again, capillary action is enabled between the layers of the mesh 12 due to the distance between the layers of the mesh 12 been chosen accordingly. In FIG. 2C, multiple layers of the mesh 12 are provided. The number of layers may be chosen according to the desired amount of liquid aerosol-forming substrate to be wicked and vaporized per time. In all described embodiments, the distance between mesh layers is around 5 to 200 μm, preferably 10 to 150 μm, more preferably 20 to 100 μm. The contacts 20 for contacting the crimped layered mesh 12 as shown in FIG. 2C are arranged to facilitate uniform current flow through the mesh 12. If desired, the contacts 20 may be provided as multiple parallel contacts 20 contacting the mesh 12 at different portions for optimizing uniform current flow.

Figure 3:
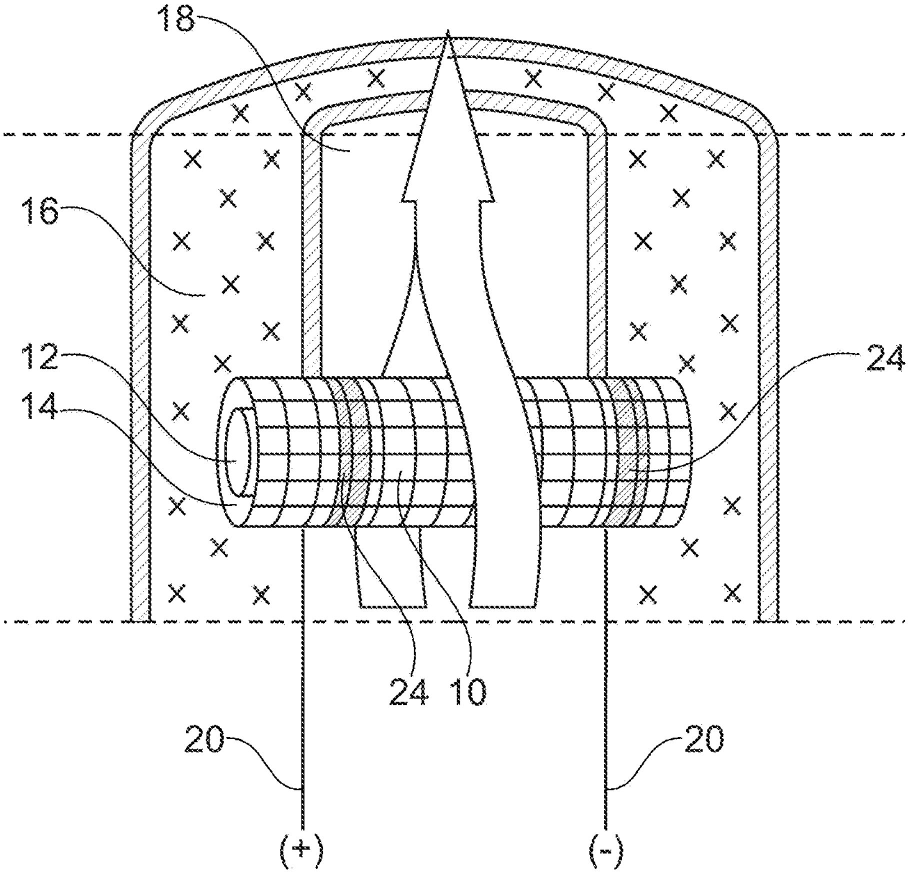

FIG. 3 shows a further embodiment, in which a tubular heater 24 is provided surrounding the meshes 12, 14 as shown in FIG. 1. In this embodiment, preferably the heating functionality and the wicking functionality are separated. The meshes 12, 14 are provided for wicking the liquid aerosol-forming substrate from the liquid supply 16 towards the airflow channel 18. The tubular heater 24 is provided for heating and vaporizing the liquid aerosol-forming substrate so that air flowing through the airflow channel 18 may entrain the vaporized substrate and carry the generated aerosol towards a user. Alternatively, the tubular heater 24 may be provided in addition to the meshes 12, 14 for heating purposes. In this case, at least one of the meshes 12, 14 as well as the tubular heater 24 are configured for heating the substrate.

The tubular heater 24 may also be arranged distanced from the meshes 12, 14 so that the tubular heater 24 contributes to the wicking of liquid aerosol-forming substrate. In other words, the tubular heater 24 may contribute to the wicking of substrate while also being configured for heating of the substrate.

The tubular heater 24 may also be used in an inductive heater system. In this case, preferably the tubular heater 24 as well as the meshes 12, 14 are formed from susceptor material and an induction coil is arranged to surround these meshes 12, 14, 24 for inductively heating all of these meshes 12, 14, 24.

The contacts 20 depicted in FIG. 3 contact the tubular heater 24. In FIG. 3, two tubular heaters 24 are depicted. However, only one tubular heater 24 may be provided being contacted by both contacts 20. If two tubular heaters 24 are provided as shown in FIG. 3, the two tubular heaters 24 may be electrically connected with each other to enable current flow between the two tubular heaters 24. The electrical connection may be provided independent from the two meshes 12, 14 so that the meshes 12, 14 do not contribute to the heating of the liquid aerosol-forming substrate. However, the tubular heaters 24 may also be electrically connected at least to the outer second mesh 14 so that this mesh 14 contributes to the heating and constitutes the electrical connection between the tubular heaters 24. The first mesh 12 may be electrically connected to the second mesh 14 so that all of the meshes 12, 14 as well as the tubular heaters 24 are used for heating of the liquid aerosol-forming substrate.

The invention claimed is:

1. A heater for generating an inhalable aerosol in an aerosol-generating device, wherein the heater comprises at least two meshes configured to have at least a substantially flat plane, wherein the meshes are arranged to be distanced from each other so that the at least two meshes wick aerosol-forming substrate between the meshes.

2. The heater according to claim 1, wherein the at least two meshes are configured as concentrically arranged tubular meshes, wherein a first mesh is provided with a first diameter, wherein a second meshes is provided with a second diameter, wherein the first diameter is smaller than the second diameter, and wherein the first mesh is arranged inserted into the second mesh.

3. The heater according to claim 1, wherein the at least two meshes are configured as a single crimped mesh.

4. The heater according to claim 1, wherein at least one of the meshes is configured as an electrically resistive metal heater.

5. The heater according to claim 4, wherein both, preferably all, meshes are configured as electrically resistive metal heaters.

6. The heater according to claim 5, wherein the at least two metal meshes are connected to a power supply in series or in parallel.

7. The heater according to claim 5, wherein electrical connections are provided bridging both, preferably all, metal meshes.

8. The heater according to claim 1, wherein the heater comprises an induction coil arranged to surround the at least two meshes and configured for heating the at least two meshes, and wherein the at least two meshes are formed from susceptor material.

9. The heater according to claim 1, wherein the heater further comprises a tubular heater, which is arranged to be distanced from and surround the at least two meshes.

10. The heater according to claim 9, wherein at least two tubular heaters are provided, which are arranged to be distanced from and surround the at least two meshes, and wherein the at least two tubular heaters are provided near opposite ends of the heater.

11. The heater according to claim 9, wherein the tubular heater at least partially covers an outer surface of the at least two meshes.

12. The heater according to claim 1, wherein the at least two meshes are arranged to be distanced from each other by 5 to 200 μm.

13. An Aerosol-generating device for generating an inhalable aerosol, wherein the device comprises:

a storage portion for storing aerosol-forming substrate, a heater for generating an inhalable aerosol in an aerosol-generating device according to claim 1, and a power supply for supplying power to the heater, wherein the at least two meshes contact the storage portion for enabling wicking of aerosol-forming substance from the storage portion towards a heating chamber of the aerosol-generating device.

14. A method for manufacturing a heater for generating an inhalable aerosol in an aerosol-generating device, wherein the method comprises the following step:

i) providing at least two meshes configured to have a least a substantially flat plane, wherein the at least two meshes are arranged to be distanced from each other so that the at least two meshes wick aerosol-forming substrate between the meshes.

* * * * *